United States Patent [19]
Becker

[11] 4,130,324
[45] Dec. 19, 1978

[54] SEAL MEANS FOR A SELF-ALIGNING BEARING

[75] Inventor: Manfred E. Becker, Newington, Conn.

[73] Assignee: Textron Inc., Providence, R.I.

[21] Appl. No.: 869,590

[22] Filed: Jan. 16, 1978

Related U.S. Application Data

[62] Division of Ser. No. 758,402, Jan. 11, 1977, Pat. No. 4,089,095.

[51] Int. Cl.$^2$ .............................................. F16C 33/74
[52] U.S. Cl. .................................... 308/36.1; 308/72; 308/238
[58] Field of Search .............. 308/72, 26, 36.1, 36.2, 308/36.3, 36.4, DIG. 7, 36.5, 3 R, 3.5, DIG. 8, 238, 240, 239; 277/81; 64/32

[56] References Cited

U.S. PATENT DOCUMENTS

| | | | |
|---|---|---|---|
| 3,126,613 | 3/1964 | Litsky | 308/72 X |
| 3,449,027 | 6/1969 | Bannister | 308/72 |
| 4,060,287 | 11/1977 | Orkin | 308/72 |

Primary Examiner—Trygve M. Blix
Assistant Examiner—Douglas C. Butler
Attorney, Agent, or Firm—Hopgood, Calimafde, Kalil, Blaustein & Lieberman

[57] ABSTRACT

The invention contemplates elastomeric-seal application to the so-called plain-spherical variety of self-aligning bearing wherein the outer ring is the product of a swaging operation which causes it to conform its cylindrical bore to a spherical surface at sliding interface with the spherical convex outer surface of an inner-bearing member. Specifically, in the machining of the swaged ring to its ultimate O.D. and other specified dimensions, a deformable axially extending lip is created, in conjunction with an undercut counterbore, at the axial end to be sealed; an elastomeric O-ring is fitted to the counterbore, and the lip is coined-over into retaining and preloading relation with the O-ring.

13 Claims, 5 Drawing Figures

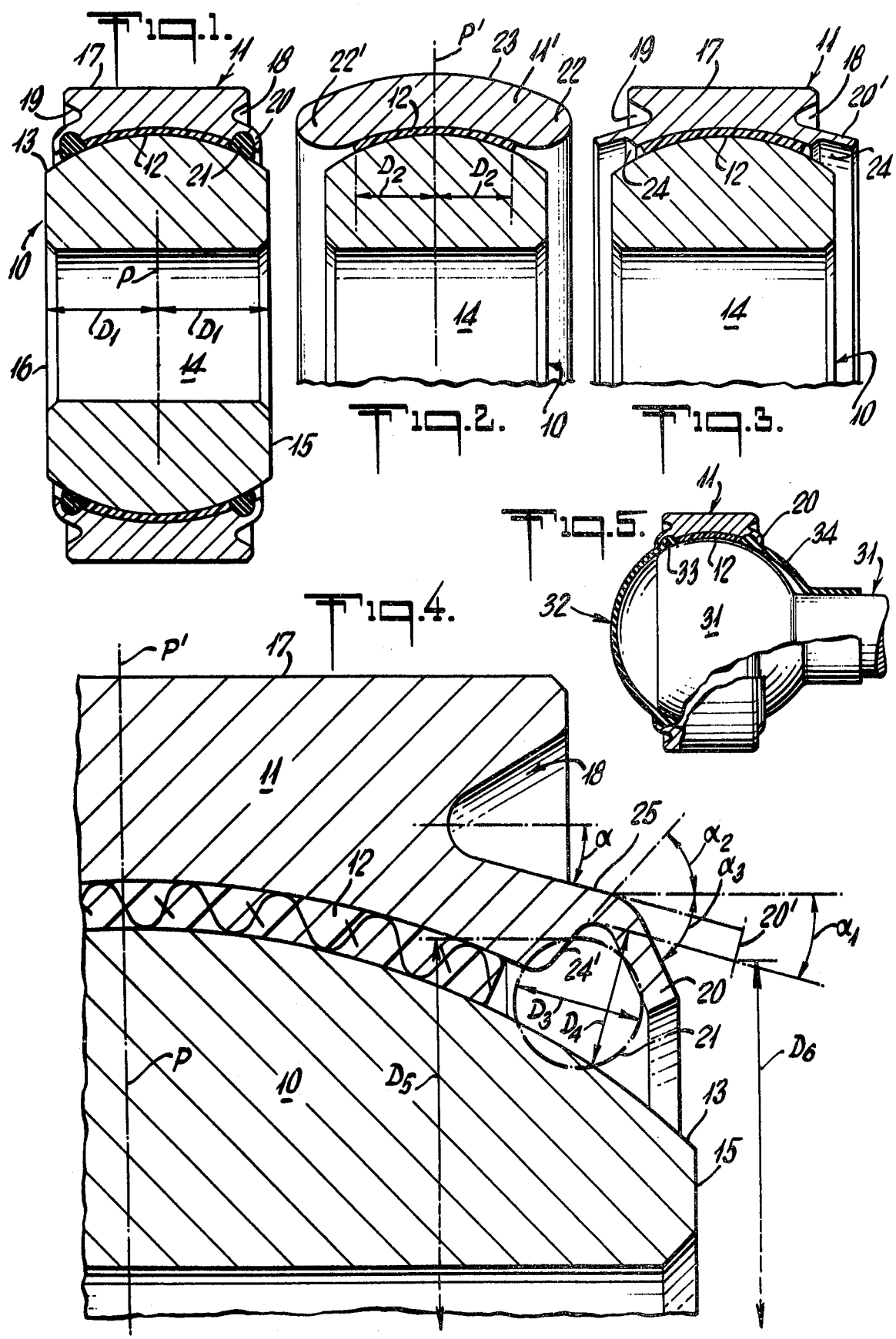

SEAL MEANS FOR A SELF-ALIGNING BEARING

This application is a division of my copending application Ser. No. 758,402, filed Jan. 11, 1977 (now U.S. Pat. No. 4,089,095, dated May 16, 1978).

This invention relates to seal means for a selfaligning bearing and will be described in connection with that variety of plain-spherical bearing in which the outer ring is the product of swaging into spherical sliding interface relation with an inner bearing member having a spherical outer surface at such interface.

In bearings of the character indicated, it is important to maintain the integrity of the surfaces which slidably engage at the bearing interface, i.e., the zone of self-aligning coaction between an inner bearing member and an outer-ring member. Often such bearings incorporate a liner of low-friction material, such as a low-friction fabric, impregnated with a hardenable material. Corrosive and abrasive environments can take premature toll of such bearings, and to date seal measures have been less than satisfactory. Generally speaking, seals are provided as separate metal-reinforced subassemblies, having snap-fit to the outer-ring member and presenting an elastomeric element for resilient contact with the spherical convex outer surface of the inner-bearing member. It is an altogether too-frequent fact of life that such seals can "pop out" of assembled relation to the ring, particularly under load and in the environment which they are intended to seal from the bearing interface. Moreover, their very nature, as subassemblies, dictates an undesirable element of cost, precision-fit, and assembly.

It is, accordingly, an object of the invention to provide an improved seal and seal technique, for bearings of the character indicated.

A specific object is to achieve the above objects with a structure requiring no more metal than required for normal plain-spherical-bearing manufacture.

Another specific object is to achieve the above objects with a structure in which an elastomeric seal ring, such as an O-ring, is the only added structural element.

A further object is to achieve the foregoing objects with a construction which is inherently self-retaining of the assembled elastomeric seal ring.

A general object is to achieve these objects with a structure of inherent low cost and great sealing effectiveness, and which has long life and reliability hitherto unavailable for hostile-environment application.

Other objects and various further features of novelty and invention will be pointed out or will occur to those skilled in the art from a reading of the following specification, in conjunction with the accompanying drawings. In said drawings, which show, for illustrative purposes only, a preferred form and method of the invention:

FIG. 1 is a vertical sectional view through a plain-spherical bearing incorporating end seals of the invention;

FIGS. 2 and 3 are fragmentary views as in FIG. 1, to show different stages in the course of practicing the method of the invention;

FIG. 4 is an enlarged fragmentary sectional view, to show structural relationships at one corner of FIG. 1; and FIG. 5 is a fragmentary view in partial section to show a modification.

As indicated generally above, the invention has particular application to plain-spherical bearings of the type which employ a swaging operation to convert, to spherical-concave, the cylindrical bore of a deformable outer-ring member. Such bearings, wherein the outer-ring bore is equipped with a bonded liner of low-friction fabric material, are the subject of Litsky U.S. Pat. No. 3,126,613, to which reference is made for greater detail. It suffices in connection with the present disclosure to identify in FIG. 1 an inner-ring member or "ball" 10 and an outer-ring member 11 having a low-friction liner 12 bonded to its bore. The fabric of liner 12 may be of woven, braided or knitted construction, employing filaments of low-friction material such as tetrafluoroethylene (TFE) and high-strength, high temperature resistant, bondable filaments such as the DuPont product known as Nomex; and the fabric and its bonding may rely upon a phenolic, epoxy or other hardenable impregnant, cured to permanent hardness.

The inner-bearing member 10 is shown as a ring with a convex spherical outer surface 13 which is relied upon to establish the sliding interface of the bearing. Ring 10 has a cylindrical mounting bore 14 which extends between chamfers at like parallel end faces 15–16. The end faces 15–16 are at equal and symmetrical axial offsets $D_1$ from a central radial plane P which includes the full great circle of the sphere of surface 13.

The outer-ring member 11 is finished to an outer cylindrical surface 17 for ultimate mounting reception in a bore, as for example the bore of a so-called rod end. And each of the end faces of member 11 is shown with a circumferentially continuous groove 18 (19), to permit spun outward deformation of a lip, for bearing retention in the rod end.

In accordance with a feature of the invention, one or both of the end faces of the outer-ring member 11 are additionally characterized by a retaining lip 20 at an undercut counterbore, and an elastomeric ring 21 is retained by the lip 20, in resilient circumferentially continuous sealing contact with the convex spherical surface 13. When the outer-ring member 11 is a swaged product, it is by nature deformable, and therefore the lip 20 may be initially more axially projecting, in readiness for insertion of the elastomeric ring 21, whereupon permanently retained assembly of the elastomeric ring is assured by a coining of lip 20 into the position shown in FIG. 1, as will be more clear from an illustrative description of the manufacture of outer-ring member 11.

As previously indicated, the outer-ring member 11 is initially a blank 11' of excessive bulk and it has a cylindrical bore into which liner 12 is set and at least partially cured, prior to assembly into tangent contact with the inner-ring member 10, tangency being at the plane P. The swaging step is then performed, causing the blank 11' and its liner 12 to develop a concave spherical bore at the region of interface with the convex spherical surface 13. Care is taken, through initial liner placement, that the axial ends of liner 12, after swaging deformation (see FIG. 2), are symmetrically disposed at substantially equal offsets $D_2$ on opposite sides of the central radial plane P' which includes the full great circle of the concave spherical bearing-interface surface of the swaged outer-ring blank 11'. The parts then have the relation shown in FIG. 2, with excessive section bulk projecting axially (at 22–22') beyond the axial ends of inner-ring member 10, and with excessive central bulk extending in a bulging arc 23 radially outward of the ultimately cylindrical outer surface 17.

Ordinarily, the excessive bulk at 22–22'–23 is trimmed off in machining operations, whereby the outer cylindrical surface 17 is defined between parallel end faces, optionally grooved at 18-19, depending upon installation-mounting requirements. However, in accordance with a feature of the invention, I alter the machining operations as to define integrally connected axially projecting lip formations 20', at undercut counterbores 24 at the respective axial ends of outer-ring member 11. The overall resulting sectional appearance is shown in FIG. 3, and also in much greater detail in FIG. 4, where a machined lip 20' is presented in phantom outline. The lip has a machined outer profile 25 which may be cylindrical but which preferably is frusto-conical, being radially convergent in the axially outer direction, at a slope $\alpha_1$ with respect to the axis of outer-ring member 11; generally, the slope $\alpha_1$ is in the range of 10° to 20°, being shown at the preferred slope of substantially 15°. The projecting outer end of counterbore 24 is similarly machined to substantially the slope $\alpha_1$, as also shown by legend in FIG. 4, and the effective axial extent of counterbore 24 is such as to overlap the axially outer limit of the inserted O-ring body. In FIG. 4, the axially inner end of the counterbore is shown to include a second frusto-conical surface 24', which flares radially outward in the axially outward direction and from a location closely adjacent liner 12, as shown; the angle of such flare is designated $\alpha_2$ with respect to the axis of outer-ring member 11, and this angle $\alpha_2$ is generally in the range 40° to 50° with respect to the outer-ring axis, being preferably about 45°.

In FIG. 4, the local body section of the elastomeric O-ring 21 is shown in phantom outline for its unstressed condition. In this unstressed condition, the body-section $D_3$ may substantially match the effective radial clearance $D_4$ of counterbore 24 with respect to the adjacent region of initial seal-ring contact with the convex spherical surface 13. Also, the maximum unstressed diameter $D_5$ of seal ring 21 is preferably greater than the minimum machined diameter $D_6$ of the counterbore 24, thereby establishing a light interference relation therewith, for initial lip retention of seal ring 21, in well displaced axial entry into counterbore 24; with this relationship, seal ring 21 is held near the inner end of counterbore 24 and is eventually driven into compressed abutment with the inner end surface 24' in the course of a coining deformation of lip 20 into the position shown in solid outline in FIG. 4. In the coining operation, lip 20 assumes a more sharply convergent relation to the outer-ring axis, at a slope angle $\alpha_3$ which is in the range of 50° to 85°, and preferably 60° to 65°.

The maximum unstressed diameter $D_5$ of seal ring 21 has been indicated preferably to exceed the insertion restriction $D_6$, but such limitation will be seen not adversely to affect the selective availability of a range of ultimate resilient preload conditions for seal contact with surface 13. For example, the unstressed outer diameter $D_5$ and body-section diameter $D_3$ may be selected such that ring 21 develops initial contact with surface 13 at an axial location which is substantially offset from the ultimately secured location of ring 21. The greater this offset, the more the seal-contact preload, for a given angle $\alpha_3$ of coined lip deformation. But, whatever the selected extent of seal-contact preload, the seal ring 21 will necessarily assume a positively retained position and shape of equilibrium support, provided by compressional contact with ring 21 via the three surfaces 24'-13-24 (deformed position). Ring-positioning stability derives from the substantially equal angular spacing with which these three surfaces contact the body section of ring 21.

It will be seen that I have described a seal construction and method meeting all stated objects. Tests under load have established its superiority to past constructions. It not only represents the barest minimum of cost and complexity, but also offers a range of ultimate preloaded-seal relationships, available through selection of seal-ring dimensional parameters $D_3$ and $D_5$, and through selection of the coined-lip angle $\alpha_3$; elastomeric stiffness provides another dimension of selective control of seal action, highly satisfactory results being thus far obtained for a sealing O-ring at 21 of 0.712-inch inside diameter, of body section diameter $D_3=0.040$ inch, and of red silicone rubber of 70A durometer. Economy of outer-ring material and machining is achieved by construction of the outer lip surface 25 in common with the radially inner wall surface of the mounting groove 18, both being shown as one, having the slope $\alpha_1$.

The coining operation on lip 20 will be understood to be illustrative. For example, the coined angle $\alpha_3$ may be the product of more than one coining operation wherein a first coining step to a less severe angle $\alpha_3$ may establish a given preloaded seal-contact relation which lends itself to direct pressure evaluation, so that it seal pressure proves to be less than specified, one or more simple coining operations to produce steepening angle increments at $\alpha_3$ will permit achievement of the desired pressure, without establishing an overloaded pressure relation.

While the invention has been described in detail for the preferred form and method, it will be understood that modifications may be made without departing from the scope of the invention. For example, the machined lip 20' will be seen to define (with adjacent spherical surface 21 and the nearby end of lining 12) a cavity adapted to in-situ molding of an elastomeric seal ring, which would of course then not be an O-ring; nevertheless, a controllable and predetermined seal-contact pressure would again be established by the coined deformation of lip 20. Still further, the undercut counterbore 24 may be machined to its ultimately desired profile (e.g., solid-outline shape of FIG. 4), and the O-ring or other elastomeric seal member could be inserted by suitable tooling which relies upon such gross misalignment of the axes of rings 10–11 as to locally place the undercut counterbore 24 beyond the adjacent axial end 15 of inner ring 10, such local placement being rotationally gyrated about the inner-ring axis in the course of O-ring insertion.

Throughout the foregoing application, the expression "coining" will be understood to be illustrative of but one technique for deforming the deformable lip 20, in that other techniques such as rolling may be preferred, depending on considerations of size and materials; and of course the lip 20 may be designed to extend into such close proximity to the adjacent convex spherical surface 13 as may be desired for particular purposes. Also, the yieldable seal member which illustratively appears as an O-ring may be of other sectional configuration, or of flexibly yieldable material other than elastomeric. Further, as illustrated in FIG. 5, the flexible seal ring may be the circumferential rim of a boot member.

Specifically, FIG. 5 shows application of the invention in the situation in which the inner member 30 is a rod-end member having a spherical convex surface or "ball" 31 to which the outer ring 11 is fitted, all in accordance with previous description. The "ball" end of the inner 30 is closed by a boot member 32, the circumferential rim 33 of which meets the substantial specification and function of the O-ring 21 previously discussed, being retained by the applicable coined or rolled lip 20. In like fashion, another boot member 34, centrally apertured for sealing contact with the shank of rod-end member 30, has a circumferential bead retained by the other coined or rolled lip 20.

What is claimed is:

1. A self-aligning bearing comprising an inner member having a spherical convex outer surface and an outer-ring member having a concave inner surface at sliding interface engagement with said convex surface, said outer-ring member having an undercut counterbore at one axial end, the axially outer end of the undercut counterbore being characterized by a surface of revolution which converges radially toward said spherical surface as a function of axially outward location along the counterbore, and an elastomeric ring compressionally retained in the counterbore and in resilient circumferentially continuous contact with said convex surface, the extent and axial location of such convergence with respect to the remainder of the counterbore being such in relation to the elastomeric-ring section and to the convex spherical radius as to axially and radially inwardly squeeze said elastomeric ring in reaction to the circumferentially continuous contact of said elastomeric ring with said convex surface.

2. The bearing of claim 1, in which the undercut counterbore is one of two, at the respective axial ends of said outer-ring member, and a second elastomeric ring similarly retained in the second counterbore in resilient circumferentially continuous contact with said convex surface.

3. The bearing of claim 1, in which the elastomeric ring is an O-ring.

4. The bearing of claim 3, in which the undercut is characterized by axially opposed adjacent frusto-conical surfaces which flare radially outward in their mutually facing respective directions, said O-ring being compressionally retained by both said frusto-conical surfaces at locally tangent cones of contact.

5. The bearing of claim 4, in which the slopes of said surfaces are such with respect to the locally tangent cones of O-ring contact with said convex surface that said O-ring engages all three of said surfaces at substantially equal angular spacings about the local body-section center of said O-ring.

6. The bearing of claim 1, in which said outer-ring member includes at the region of said interface engagement a liner having tetrafluorethylene filaments exposed at the sliding interface.

7. The bearing of claim 1, wherein said inner member has a cylindrical bore between parallel axial-end faces, the undercut counterbore and said elastomeric ring being at a first axial offset from that geometric radial plane of the outer-ring axis which includes the axially central great circle of the concave inner surface, said first axial offset being less than the offset by which the corresponding end face of said inner ring is spaced axially from the axially central great circle of said convex spherical surface; whereby to the extent of the effective difference between said offsets, said elastomeric ring provides full circumferential sealing action for a range of axial-misalignment relations between the axis of said inner member and the axis of said outer-ring member.

8. The bearing of claim 1, in which said outer-ring member has a circumferentially continuous axially outwardly open groove radially outwardly of and proximate to said counterbore.

9. The bearing of claim 1, in which said inner member is a rod-end member.

10. The bearing of claim 1, in which said elastomeric ring is the circumferential rim of a boot member.

11. A self-aligning bearing comprising an inner member having a spherical convex outer surface and an outer-ring member having a concave inner surface at sliding interface engagement with said convex surface, said outer-ring member including at least at one axial end thereof an annular lip of deformable material in circumferentially continuous radially spaced relation to the adjacent region of said convex surface, and an elastomeric O-ring in the radial space between said lip and said convex surface, said O-ring being axially compressionally retained in such space by the axially outer end of said lip in radially inwardly displaced approach to said convex surface, and the extent of such axial compression being such as to resiliently and circumferentially continuously radially inwardly load O-ring contact with said convex surface.

12. A self-aligning bearing comprising an inner-ring member having a spherical convex outer surface and a central cylindrical bore between parallel end faces which are symmetrically offset on opposite sides of the central great-circle radial plane of said outer surface, and an outer-ring member surrounding said inner-ring member and having a low-friction fabric liner with a concave inner surface in sliding interface engagement with said convex surface, said fabric liner being of lesser axial extent than said inner-ring member whereby axial-end offsets exist between corresponding ends of said liner and of said inner-ring member, and elastomeric O-ring seal means carried at the respective axial ends of said outer-ring member and in resilient circumferentially continuous contact with said convex surface and within said axial-end offsets, each said axial-end offset having an undercut counterbore characterized by a surface of revolution which converges radially toward said spherical surface as a function of axially outward location along the counterbore, the extent and axial location of such convergence with respect to the remainder of the counterbore being such in relation to the elastomeric-ring section and to the convex spherical radius as to axially and radially inwardly squeeze the applicable one of said O-ring seal means, said squeeze being in reaction to the circumferentially continuous contact of said one seal means with said convex surface.

13. A self-aligning bearing comprising an inner member having a spherical convex outer surface and an outer-ring member having a concave inner surface at sliding interface engagement with said convex surface, said outer-ring member having an undercut counterbore at one axial end, the axially outer end of the undercut counterbore being characterized by a surface of revolution which converges radially toward said spherical surface as a function of axially outward location along the counterbore, and a ring of flexibly yieldable seal material retained in the counterbore and in resilient circumferential continuous axially squeezed and radially inwardly loaded contact with said convex surface.

* * * * *